Nov. 23, 1965  G. B. LOPER ET AL  3,219,968
METHOD AND SYSTEM FOR RECORDING REPETITIVE SEISMIC SIGNALS
Filed Jan. 31, 1961                                    2 Sheets-Sheet 1

FRANK J. McDONAL
GEORGE B. LOPER
INVENTOR.

BY D. Care Richards
   Attorney

Nov. 23, 1965     G. B. LOPER ET AL     3,219,968
METHOD AND SYSTEM FOR RECORDING REPETITIVE SEISMIC SIGNALS
Filed Jan. 31, 1961     2 Sheets-Sheet 2

FRANK J. McDONAL
GEORGE B. LOPER
INVENTOR.

BY D. Carl Richards
Attorney 3,219,968
METHOD AND SYSTEM FOR RECORDING REPETITIVE SEISMIC SIGNALS
George B. Loper and Frank J. McDonal, Dallas, Tex., assignors to Socony Mobil Oil Company, Inc., a corporation of New York
Filed Jan. 31, 1961, Ser. No. 86,035
9 Claims. (Cl. 340—7)

This invention relates to seismic exploration and more particularly to exploration wherein seismic pulses are generated periodically as an exploring system is moved along a traverse, the resultant signals being recorded serially in reproducible form and following termination of recording to reproduced for formation of a seismic record section.

In seismic exploration particularly in marine areas it has been found desirable to move an exploring system along a preselected course with a seismic source and one or more seismic detectors maintained in a predetermined spaced relationship with respect to one another. Periodic actuation of the source results in production of a family of seismic signals. Heretofore it has been found desirable in order to enhance signal-to-noise ratio of such signals to composite a given seismic signal with seismic signals produced upon successive actuations of the seismic source at different points spaced along the traverse.

It is an object of the present invention to provide a method and system for facilitating such seismic exploration, particularly wherein the repetitively generated seismic signals are recorded serially on a magnetic reproducing medium and are then reproduced and treated with the desired compositing and recorded in side-by-side relation to provide a graph of reflecting subsurface interfaces beneath the traverse.

More particularly in accordance with the present invention, there is provided a method of seismic exploration which comprises moving a source and detector of seismic waves in predetermined spaced relation along a traverse. The seismic source is then periodically actuated to generate seismic waves successively along the traverse. Seismic signals resulting from each actuation of the source are detected and are recorded in magnetically reproducible form to record serially the members of a family of signals each representative of the layering of seismic reflecting interfaces located beneath the traverse. Following recording thereof, the family of signals is reproduced in the order of the recording thereof and rerecorded as a visual representation in side-by-side relation to provide a graphic representation of the layering of the reflecting interfaces.

In a more specific aspect of the invention, a timing signal is generated and recorded with the seismic signals. Thereafter the timing signal is reproduced along with the family of signals to maintain a predetermined time relation between components of each of the family of signals and the timing signal so that there may be recorded under control of the timing signal a faithful representation of the layering of the subsurface reflecting interfaces.

Further, the invention relates to a seismic exploration system involving the combination of a seismic source and detector adapted to be moved in predetermined spaced relation along a traverse with means connected to the source adapted periodically to actuate the same to generate in sequence a seismic pulse at each of a plurality of points along the traverse. A magnetic tape recorder connected to the detector records in phonographically reproducible form signals representative of the seismic waves thereby to provide a family of stored signals with one member thereof for each of said pulses. Reproducing means adapted to receive the magnetic tape is provided synchronously to produce from the family of signals stored thereon a plurality of like families of signals spaced one from another time intervals proportional to the period between said seismic pulses. A compositing means connected to the reproducing means serves to combine the plurality of families of output signals and a recorder connected to the compositing means records the signals in side-by-side relation to form a graphic representation of the location of reflecting interfaces underlying the traverse. In a preferred embodiment of the invention the recording of the signals from the reproducing means is maintained under the control of a timing signal recorded on the magnetic tape. In accordance with a further aspect of the invention a filter is provided for separating timing signals from voice signals superimposed thereon thereby to permit with a minimum of elements time control for the seismic data together with identifying data as to the locations at which the seismic data is obtained.

For a more complete understanding of the present invention and for further objects and advantages thereof, reference may now be had to the following description taken in conjunction with the accompanying drawings in which.

Figure 1:
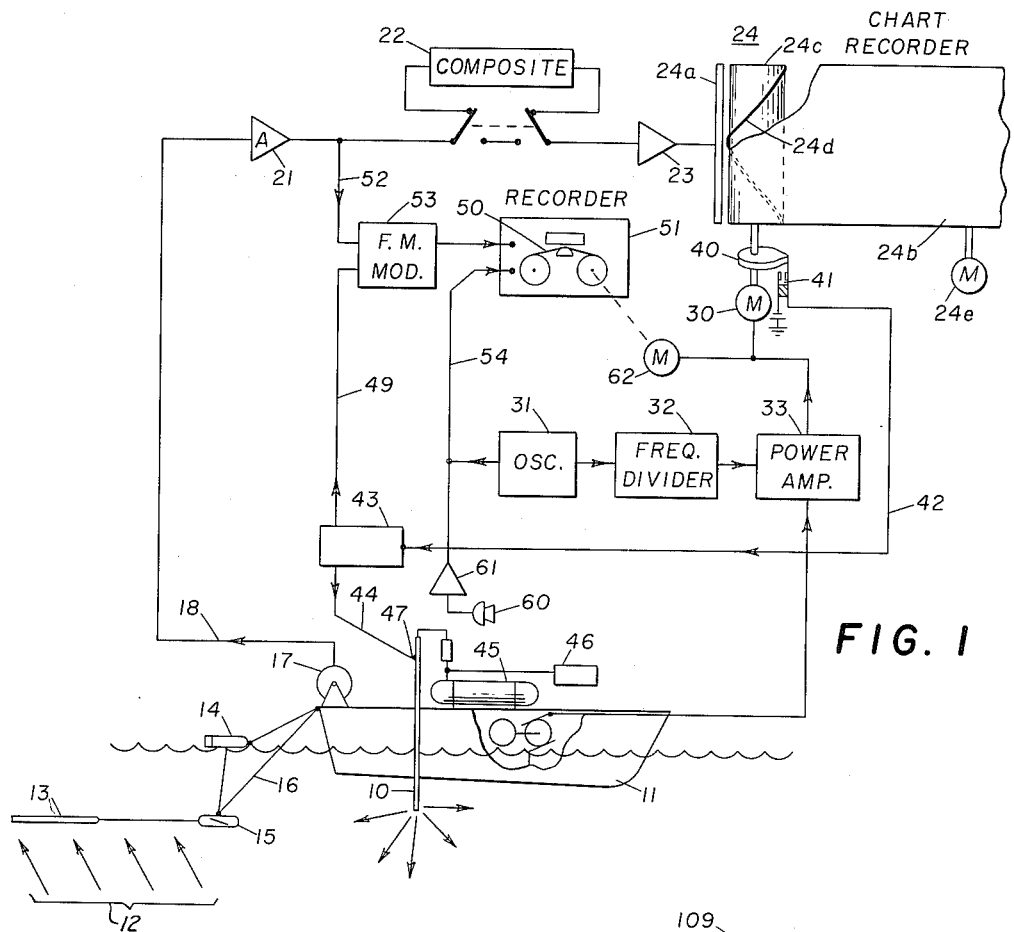
FIG. 1 represents in block form a marine exploring system embodying the present invention.

Referring now to FIG. 1, there is illustrated a seismic source 10 which is mounted on a boat 11 and is adapted to produce seismic waves periodically which travel downwardly to subsurface reflecting interfaces and thence back as along paths 12 to a seismic detector 13. Detector 13 is shown in the form of an elongated streamer and may be of the type disclosed in Patent No. 2,923,916 to John W. Woodworth, a co-worker of applicant. Detector 13 is towed behind boat 11 and is maintained at a predetermined known depth by a surface vane 14 coupled to a diving vane 15, both of which are mechanically connected to boat 11 so that they are towed along a given traverse. A cable 16 extends from detector 13 to a reel 17 mounted on boat 11. A signal channel 18 from the detector 13 extends from reel 17 to an input amplifier 21. Seismic signals are then applied from amplifier 21 to a recorder unit which may include a compositor 22, an amplifier 23 and a chart recorder 24. The compositor 22 may be of a delay drum type in which signals first appearing on the output of amplifier 21 are temporarily recorded and are then added to subsequently occurring signals so that the signal applied to amplifier 23 represents the sum of a plurality of signals which occur serially in time but which through the action of compositor 22 are so combined as to represent a composite of a plurality of signals. The composite signal is then applied to a recording bar 24a of recorder 24 for impressing upon a chart 24b a representation of the intensity of the electrical signals. The recording may conveniently be accomplished through the use of a rotating drum 24c which carries a spiral 24d thereon. A signal potential applied to the bar 24a causes an electric current to pass through chart 24b to the spiral 24d to register an impression upon the chart 24b of variations in magnitude of the electrical signal.

As the drum 24c rotates, the point at which the spiral 24d and the blade 24a are in registration sweeps laterally across the recording chart 24b. Variations in signal amplitude at the output of the amplifier 23 appear as variations in the intensity of the trace impressed to the chart 24b by a variable intensity spark discharge between the blade 24a and the spiral 24d, as is well understood by those skilled in the art and as generally embodied in spark discharge recording systems.

The drum 24c is driven by a motor 30 at a rate which is controlled from a master oscillator 31. More particularly, oscillator 31 in one embodiment of the invention was one having a carefully controlled output of frequency of 1000 cycles per second. The output of oscillator 31 was applied to a frequency divider 32 to reduce the frequency to 62.5 cycles per second. The latter signal was then applied to a power amplifier 33 whose output in turn was connected to motor 30. By this means oscillator 31 of controlled frequency characteristics was employed to drive the synchronous motor 30 at a precise rate so that the exact time relationships of components of electrical signals at the output of amplifier 23 appeared on chart 24b.

Chart 24b is driven past the recording bar 24a by a suitable chart drive motor 24e. A cam 40 mounted on the shaft leading between motor 30 and drum 24c serves to close switch 41 periodically to apply an actuating signal by way of channel 42 to a control unit 43. Control unit 43 is connected by way of channel 44 to the source 10 periodically to energize source 10. In the form illustrated, source 10 is an elongated tubular element into the top of which there is fed a combustible gas mixture such as propane derived from a tank 45 mounted on boat 11 and air derived from an air compressor 46 mounted on boat 11. The muzzle of source 10 extends to a point below the water surface. The combustible gas mixture in practice is fed continuously into the top of the elongated tube forming the source 10. Application by way of channel 44 of periodic high voltage pulses from control unit 43 to a spark plug unit 47 serves to ignite the combustible gas mixture. The resultant expansion of gases produces a sharp, relatively low frequency, acoustic impulse on the surface of the water at the muzzle of the source 10 thereby producing seismic waves. Thus under the control of oscillator 31 the source 10 produces periodic acoustic waves. Seismic waves preferably are generated at the rate of about one every three seconds, and the drum 24c completes one revolution in such time interval. The signals recorded on chart 24b will therefore represent electrical signals received by detector 13 in each three second interval between successive acoustic impulses from source 10.

In accordance with the present invention, not only are the signals recorded on chart 24b but also they are recorded serially, without compositing, on a tape 50 in a tape recorder 51. More particularly, the output of amplifier 21 is connected by channel 52 to an F.M. modulator 53. The output of modulator 53 is applied to a first input terminal of the recorder 51. Recorder 51 preferably is a high fidelity system having a capacity of at least two channels so that the family of seismic signals from detector 13 may be recorded serially on one of the channels. On the second of the channels there is recorded a timing signal which is derived from oscillator 31 and is applied to the second input terminal by way of channel 54. As above indicated, the timing signal is a 1,000 cycle per second timing voltage.

It will be noted that a channel 49 extends from control unit 43 to a second input terminal of modulator 53. By this means there is recorded a time break signal which is an impulse corresponding with the instant of generation of each acoustic pulse by source 10 in its real time position relative to the components of the seismic waves detected by the detector 13.

In accordance with the present invention there is further provided means for recording on tape 50 data which is critical or useful as to the location of the exploring system on a given traverse and otherwise to provide for an on the spot storage of information necessary to the interpretation of the signals recorded on tape 50. For this purpose a microphone 60 is connected through a suitable amplifier 61 to the channel 54 so that voice signals may be superimposed upon the timing track signals from oscillator 31 or may be recorded in those intervals when the timing signal and the system are not in operation. In any event there is provided positive control of the recording of the signals both with reference to the timing signal from oscillator 31 and with reference to voice descriptions of any location data necessary.

Further it will be noted that the output of the power amplifier 33 is connected to motor 62 to control the speed at which the recording medium 50 is driven past the recording point in recorder 51. By this means not only is the drum 24c controlled accurately in its time portrayal of the seismic signals, but the recording medium 50 is accurately controlled as to speed so that the position of the seismic signals from detector 13 will represent their actual time occurrence. If a reliable source of power is available for driving recorder motor 62, then the linkage between power amplifier 33 and motor 62 may be dispensed with.

Figure 2:
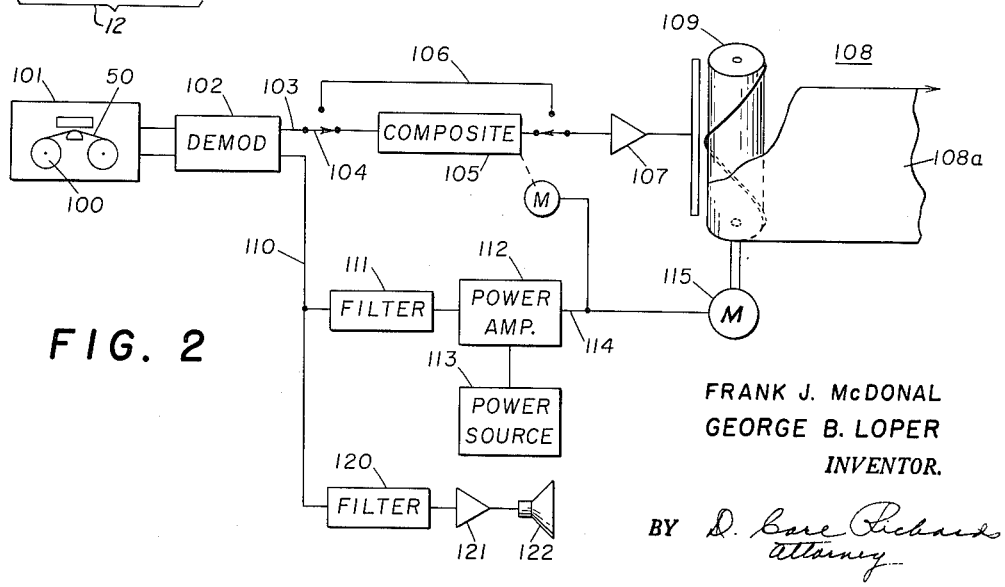
FIG. 2 illustrates in block form a reproduction system embodying the present invention.

It will now be understood that the system of the type illustrated in FIG. 1 will be employed as the boat 11 is moved along a predetermined traverse. Magnetic tapes of the order of one-half to two hours or more in length may be employed on recorder 51 to permit the boat 11 to cover a substantial sector of a given traverse before tape replacement is necessary. The tapes thus produced by the operation set forth in connection with FIG. 1 may then be shipped to a point convenient for processing whereupon the system illustrated in FIG. 2 may be placed in operation. Referring to FIG. 2 record tape 50 may be placed on reel 100 in a tape reproducing system 101. The output signals appearing on tape 50 are then applied on the signal channel by way of a demodulator unit 102 and channel 103 to a switch 104. The signal may then be applied selectively either to a compositor 105 or by way of conductor 106 to a recording amplifier 107 and thence to a chart recorder 108 which may be of the type above described in connection with FIG. 1. The second output channel 110 of demodulator 102 is connected to the input of a filter 111 whose output in turn is connected to a power amplifier 112. Filter 111 is designed selectively to pass to power amplifier 112 only those frequency components corresponding with the timing signal from oscillator 31 of FIG. 1 or a submultiple thereof as hereinafter described. The amplifier 112, deriving energy from the power source 113, applies driving power to motor 115 by way of channel 114. Motor 115 drives drum 109 of recorder 108. By this means a predetermined and fixed relationship is maintained between the time scale effective in recorder 108 and the time occurrence of seismic signals appearing at detector 13, FIG. 1.

Voice signals appearing on channel 110 are applied from filter 120 by way of an amplifier 121 to a speaker 122 so that as the chart 108a is receiving impressions of signals from the tape 50, pertinent data as to the location thereof will be heard by the operator. At the same time the timing signal from amplifier 112 serves to maintain fixed the timing scale on chart 108a.

The seismic signals which appear on tape 50 in serial form may then be composited in unit 105 or recorded without compositing through the bypass channel 106 and thus appear on chart 108a in parallel or in side-by-side relation, thus providing a clear and accurate representation of the layering of subsurface reflecting interfaces.

Figure 3:
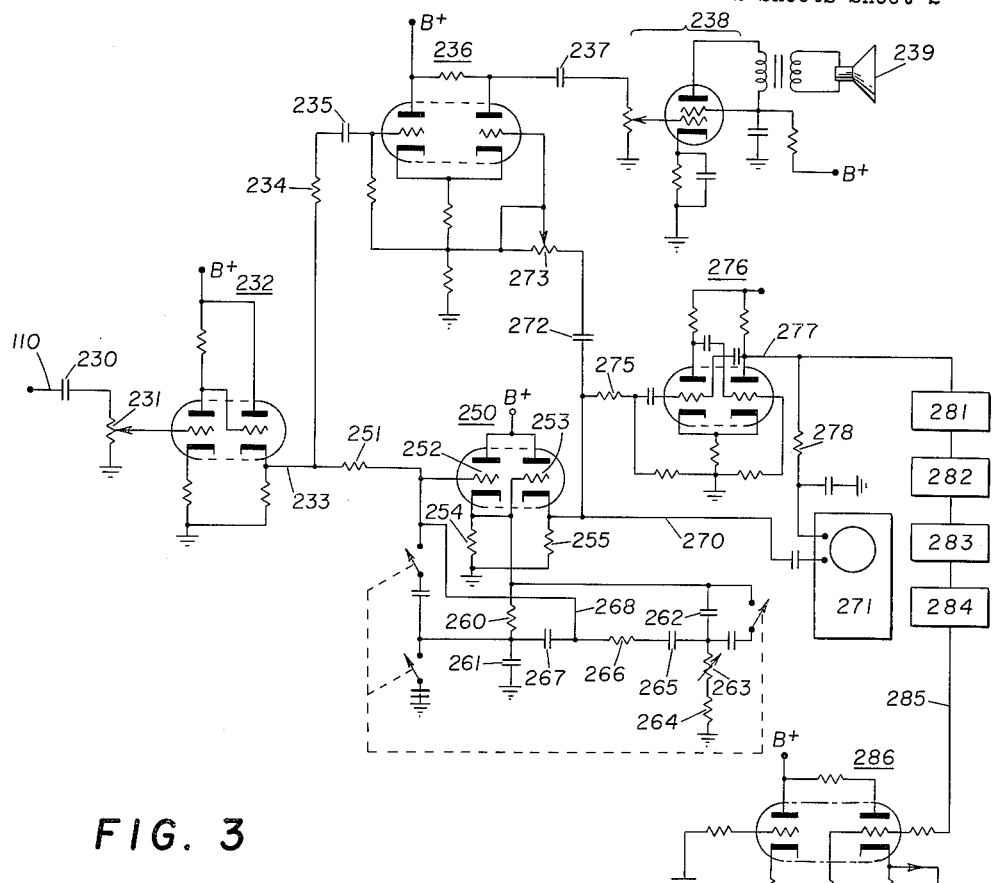
FIG. 3 is a schematic diagram of a control system employed in the reproduction of serially recorded seismic signals.

Referring now to FIG. 3, there is illustrated in schematic form a system for assuring that the final presentation of the data initially recorded in serial form may accurately portray the relationship between subsurface reflecting horizons. That portion of the system illustrated in FIG. 3 is a detailed diagram of the system illustrated in the block diagram FIG. 2 for treating the signals appearing at the output of demodulator 102. In FIG. 2 the functional aspects of the system were emphasized while in FIG. 3 the structural features of components are more clearly set forth.

The family of signals representative of the seismic waves are transmitted by way of channel 103 and condenser 200 to an amplifier 201 and then to a recording head 202 which is mounted adjacent the periphery of a drum 203 of compositor 105. A plurality of detecting heads 204, 205–210 are positioned at uniformly spaced joints around the periphery of drum 203 to detect signals recorded thereon by recording head 202. The speed of drum 203 is controlled by a motor 211 such that the period required for rotation of a given segment of drum 203 from recording head 202 to detector head 204 is equal to the time interval occupied by a given signal in the family of signals appearing on channel 103. Signals thus detected by the heads 204–210 are transmitted by way of amplifier 107 to a recording head 220 on recorder 215. In this embodiment of the invention the recorder is illustrated as a drum-type unit 216 in which a recording paper is mounted on a drum under control of motor 217 to receive impressions of the signals transmitted from amplifier 107. The recording head 220 is mounted on a spiral shaft 221 which is driven from motor 217 by way of a reduction gear box 222. Thus for each revolution of the drum of recorder 215, the recording head 220 is moved an increment along the length of the drum to provide a new track around the drum for each revolution of the drum. Thus the composite signals from amplifier 107 may be recorded in side-by-side relation on the chart carried by the drum of recorder 215.

It is essential that the drum 203 of compositor 105 and the drum of recorder 215 be moved in a precise relationship with respect to the signals as recorded on tape 50. This is accomplished as above indicated by the use of a timing signal which is recorded on tape 50 along with the family of seismic signals. The timing signal together with any voice communication superimposed thereon is applied to the system of FIG. 3 by way of the output channel 110 leading from demodulator 102 of FIG. 2. Signals are passed through condenser 230 to a volume control unit 231 on the input of an input amplifier 232. Amplifier 232 is generally conventional in its nature, having a cathode follower output channel 233. Signals appearing on channel 233 represent the combined 1,000 cycle timing signal and the voice communication. The combined voice and timing signals are applied by way of resistor 234 and condenser 235 to the input of a first stage of a differential amplifier 236. The output of the differential amplifier 236 is then applied by way of condenser 237 to an amplifier stage 238 and then to a speaker unit 239. In the differential amplifier, provision is made for removal of the 1,000 cycle timing signal so that only the voice components of the signal on channel 110 will drive the speaker 239. Thus the amplifier 236 serves as a part of a filter unit for the elimination of the timing signal from the voice channel.

The timing signal is selected from the combined time and voice signals through a resonant circuit in the cathode follower amplifier unit 250. More particularly, the signal is applied by way of a resistor 251 to the input grid of a first triode section 252. The cathodes of sections 252 and 253 are connected by way of cathode resistors 254 and 255 to ground. The anodes of tubes 252 and 253 are connected directly together and to a suitable B-supply source, the negative terminal of which is connected to ground. The dual triode unit 250 and its associated network form a bridge unit which is resonant sharply at 1,000 cycles per second, the frequency of the timing signal on channel 110. The resonant circuit has a first branch comprising resistor 260 and condenser 261 connected in series between the cathode of tube 252 and a control grid of tube 253. The second branch includes a condenser 262 and a pair of resistors 263 and 264. A D.C. blocking condenser 265 is connected between the juncture of condenser 262 and resistor 263 and then by way of resistor 266 and condenser 267 to the juncture between condenser 261 and resistor 260. The juncture between condenser 267 and resistor 266 is then connected by way of conductor 268 to the control grid of the first tube 252 to form a feed back network. The tuned circuit thus far described, involving elements 260, 261, 262, 263, 264, 266 and 267, is sharply tuned at 1,000 cycles so that there appears on the output channel 270 a signal which is the timing signal only since the tuned circuit emphasizes the timing signal and eliminates the voice components. The timing signal on channel 270 is then fed to a first input terminal of an oscilloscope monitor 271. It is also fed by way of condenser 272 and control resistor 273 to the control grid of the second stage of amplifier 236. Thus the difference between the voltages appearing on grids of the two stages of the differential amplifier 236 appears at the output. Since the first stage has a signal applied thereto which is the combination of voice and timing signal and since the signal to the second stage is the timing signal only, there remains for transmittal by way of condenser 237 only the voice signal.

The timing signal is also applied from channel 270 by way of resistor 275 to the input of a free-running multivibrator 276. Multivibrator 276 is so constructed, as is well understood by those skilled in the art, to be free-running at a frequency of about 995 cycles per second. By this means, the multivibrator operates normally at a frequency close to but slightly under the frequency of the timing signal on channel 110. The timing signal thus applied by way of resistor 275 to the multivibrator 276 serves to synchronize the multivibrator 276 with the timing signal to provide an accurately controlled series of timing pulses. At the same time in the event that one or more timing pulses are lost in the recording and reproducing so that they do not appear on channel 110, the multivibrator 276 will continue to run at a frequency closely approximating that of the timing signal so that the system will not fail by reason of the dropping of one or more timing pulses from the control signal. Thus the tuned circuit including elements 260–267 may be considered to have a flywheel effect to maintain the timing signal which is to be employed for driving the drum 203 and the drum of recorder 215 for short time intervals independent of the recorded timing signal. Signals appearing at the output of the multivibrator 276 as on channel 277 are then applied by way of resistor 278 to a second input terminal of the monitor oscilloscope 271. By this means an operator can determine at all times whether or not the timing signal from the channel 110 is actually controlling the multivibrator 276. If the timing signal is absent, the output of the multivibrator 276 will provide an indication on oscilloscope 271 which is merely a straight line. If the timing signal is present on channel 270, then there will appear a Lissajou figure on the face of the oscilloscope to indicate the synchronization between the multivibrator 276 and the timing signal itself.

Timing signals appearing on channel 277 are also applied to four stages of frequency dividers 281–284. In each stage the frequency of the timing signal is reduced by one-half so that there appears on the output channel 285 a timing signal having the frequency of 62.5 cycles per second. The latter signal is then applied to an output amplifier 286 and then by way of channel 287 to the power amplifier 112. The output of the power amplifier 112 is then thus carefully controlled as to its frequency so that the motors 217 and 211 which are synchronous motors may be positively controlled as to the speed with which they drive their respective drums. In the event the timing signal fails to appear on channel 270, the drums may still be caused to operate at a speed substantially the desired speed by means of the free-running character of the multivibrator 276. Furthermore, in the reproduction of serially recorded seismic data it is desirable to have the compositor 105 and the recorder 215 in operative standby condition so that all of the data on a given tape can be utilized in the playback and rerecording thereof. For this purpose the free-running multivibrator 276 may be energized along with power amplifier 112 so that the compositor drum 203 and the drum of recorder 215 will be continuously operative at about the proper speed. When tape recorded seismic data is to be composited and recorded, the appearance of the timing signal at the input of the multivibrator 276 immediately locks the drum of compositor 105 and the drum of recorder 215 into synchronism with the timing signal so that the positive control thereof is assured.

In practice the signals on the magnetic tape 50 recorded in the field are returned from a field station to a data processing center where they are reproduced. In the system illustrated in the drawings the reproduction of the seismic signals are recorded in serial form is under the control of a power source that is independent of the timing signal recorded on the reproducible medium. However, the playback of the signals should be substantially at the same speed as originally recorded. However, the speed may vary so that the timing signal is not precisely 1,000 cycles per second but may vary slightly therefrom. In this case, the speed of the compositor drum 203 and the drum of the recorder 215 would be varied concomitantly. By this means the spatial relationship between components of the signals recorded on the recorder 215 will bear the same spatial relationship as the time relationship thereof with reference to the generation of each acoustic pulse in the original taking of the data.

Thus there is provided a method of seismic exploration in which a source and detector of seismic waves are moved in a predetermined spaced relation along a traverse. The source is periodically actuated to generate acoustic pulses at spaced points along the traverse. In each time interval between successive acoustic pulses the seismic waves appearing at the detector produce signals representative thereof. The detected signals are then recorded serially on a magnetic recording medium. The recorded signals are reproduced from the medium and are recorded in side-by-side relation maintaining a spatial relationship between components of each signal relative to the initiation of the seismic waves resulting in such components as were present in the time relation between the generation of each acoustic pulse and the reception of such components by the detector. It may be found desirable to employ a feedback or servo system whereby the signal appearing on channel 114 is employed to control the speed of the playback unit for reproducing the seismic signals and the timing signal from the tape 50.

However, in the preferred embodiment, the free-running multivibrator 276 normally operable at a frequency slightly below the lowest point in the range of variations of the timing signal from the playback unit will be employed to control the final recording of the signals.

Having described the invention in connection with certain embodiments thereof, it will be understood that further modifications may now suggest themselves to those skilled in the art and it is intended to cover such modification as fall within the scope of the appended claims.

What is claimed is:

1. The method of seismic exploration which comprises establishing a seismic sending station and receiving station in predetermined spaced relation, moving said stations along a traverse, moving a magnetic recording medium past a recording point, generating a constant frequency timing signal, in response to said timing signal, periodically producing an acoustic pulse to generate a train of seismic pulses, one of said seismic pulses being generated at each of a plurality of points spaced along said traverse, detecting the seismic waves resulting from each of said seismic pulses as they arrive at said receiving station, recording in magnetically reproducible form said timing signal on said medium, recording in magnetically reproducible form on said medium seismic signals representative of said seismic waves to store serially on said medium a family of signals indicative of the locations of seismic reflecting interfaces underlying said traverse, reproducing said timing signal, reproducing said family of signals in the order of the recording thereof, and under control of said timing signal recording in side-by-side relation a visual representation of said family of signals to provde a graph of the locations of said reflecting interfaces.

2. The method of seismic exploration which comprises moving a source and a detector of seismic waves in predetermined spaced relation along a traverse, moving a magnetic recording medium past a recording point, generating a constant frequency timing signal, periodically actuating said source to generate seismic pulses successively, one of said seismic pulses being generated at each of a plurality of points spaced along said traverse, detecting the seismic waves resulting from each of said seismic pulses as they arrive at said detector, recording said timing signal in magnetically reproducible form on said medium, recording in magnetically reproducible form on said medium seismic signals representative of said seismic waves to store serially on said medium a family of signals indicative of the locations of seismic reflecting interfaces underlying said traverse, reproducing said timing signal, reproducing said family of signals in the order of the recording thereof, and under control of said timing signal recording in side-by-side relation a visual representation of said family of signals to provide a graph of the locations of said reflecting interfaces.

3. The method recited in claim 2 further comprising: superimposing upon said timing signal an identifying signal of a different frequency than said timing signal to identify information as to the locations of pionts of generation of seismic impulses, and recording said identifying signal superimposed upon said timing signal in magnetically reproducible form on said medium.

4. In seismic exploration the combination which comprises a seismic source and detector, means for moving said source and detector in predetermined spaced relation along a traverse, control means for generating a timing signal, means connected to said source and to said control means for periodically actuating said source in response to said timing signal sequentially to generate a seismic pulse at each of a plurality of points spaced along said traverse, a signal storage means connected to said control means to record said timing signal, connections between said detector and said signal storage means for serially recording in phonographically reproducible form signals representative of seismic waves arriving at said detector resulting from each said pulse to provide a family of stored signals, reproducing means for reproducing said timing signal and for synchronously reproducing said family of stored signals a plurality of times at intervals proportional to the period between the seismic pulses to provide a plurality of families of output signals, compositing means connected to said reproducing means for combining said plurality of families of output signals, and a recorder connected to said reproducing means and to said compositing means for recording under control of said timing signal composite output signals in side-by-side relation in visual form graphically to represent the locations of reflecting interfaces underlying said traverse.

5. The method of seismic exploration which comprises moving a source and detector of seismic waves in predetermined spaced relation along a traverse, moving a magnetic recording medium at a substantially constant rate past a recording point, generating a timing function, in response to said timing function periodically actuating said source to generate an acoustic pulse at uniformly spaced points along said traverse, detecting the seismic waves resulting from each acoustic pulse as they arrive at said detector, recording said timing function on said medium, separately recording in serial relation on said magnetic medium signals representative of said seismic waves to provide a family of reproducible signals representative of seismic reflecting interfaces underlying said traverse, reproducing said family of signals, reproducing said timing function concurrently with the reproduction of said family of signals to generate an output time control signal, generating a secondary timing signal which normally differs in frequency from said time control signal, synchronizing said secondary timing signal with said output time control signal, and recording in side-by-side relation the reproduced family of signals under the control of the synchronized secondary timing signal to provide a graph of said reflecting interfaces.

6. A seismic exploration system which comprises a source and a detector of seismic waves interconnected in a predetermined spaced relation, means for moving said source and detector along a seismic traverse, means for moving a magnetic recording medium at a constant rate past a recording point, generating means for generating a timing signal, means responsive to said timing signal periodically for actuating said source to generate a succession of seismic impulses one at each of a plurality of spaced points along said traverse, for travel thereof to subsurface reflecting interfaces and back to said detector to actuate said detector for production of signals representative of reflected seismic waves, a first recording means connected to said detector for impressing said signals on said recording medium as it passes said recording point to produce serially on said medium a family of signals representative of the layering of said reflecting interfaces below said traverse, a second recording means connected to said generating means for impressing said timing signal on said recording medium, a voice channel connected to said second recording means for superimposing vocal data signals upon the recording of said timing signal, means including reproducing means adapted to produce separate electrical signals respectively representative of said timing signal, said vocal signals and said family of signals from said medium, and a third recording means connected to said reproducing means and responsive to the reproduced timing signal for recording said family of signals in side-by-side relation to provide a visual representation of said reflecting interfaces.

7. In seismic exploration wherein a family of repetitive seismic signals are recorded serially on a first track on a magnetic recording medium having a second track which includes a recording of a constant frequency timing signal with voice signals superimposed thereon, the combination which comprises reproducing means for producing first and second electrical signals representative of said family of signals and the combination of said timing signal and said voice signals respectively, a timing circuit sharply tuned to the frequency of said timing signal and connected to said reproducing means for receiving the second of said electrical signals for eliminating in the output circuit thereof components of said voice signals, a generator for generating a control signal of a frequency normally lower than the frequency of said timing signal, connections between said output circuit and said generator for applying said timing signal to said generator to synchronize the same with said timing signal, a recorder, circuit means including connections including a power amplifier extending between said generator and said recorder for applying power at the frequency of said timing signal thereto, and a second circuit interconnecting said reproducing means and said recorder for applying said family of signals to said recorder to record members of said family of signals in a side-by-side relation under the control of said generator.

8. In seismic exploration wherein a family of repetitive seismic signals are recorded serially on a first track of a magnetic recording medium having on a second track a recording of a constant frequency timing signal with voice signals superimposed thereon, the combination which comprises reproducing means for producing first and second electrical signals representative of said family of signals and the combination of said timing signal and said voice signals respectively, a first circuit sharply tuned to the frequency of said timing signal connected to said reproducing means for receiving said second electrical signals for eliminating in an output circuit thereof components of said voice signals, means for inverting the components of the combined voice-timing signal relative to the timing signal in said output circuit, mixing means for combining in an output circuit said timing signal from said first circuit and the inverted signals to cancel said timing signal from said second electrical signals and to leave only a voice signal, a transducer connected for utilization of said voice signal, a generator for generating a control signal of a frequency normally lower than the frequency of said timing signal, circuit means including connections between said output circuit of said first circuit and said generator for applying said timing signal to said generator to synchronize the same with said timing signal, a recorder, circuit connections including a power amplifier extending between said generator and said recorder for applying power at the frequency of said timing signal thereto, and a second circuit interconnecting said reproducing means and said recorder for applying said family of signals to said recorder to record numbers of said family of signals in side-by-side relation under the control of said generator.

9. A system for geophysical exploration which comprises:
   a source of acoustic impulses and a detector of acoustic impulses positioned in predetermined spaced relation with each other,
   means for moving said source and said detector along a line of exploration,
   an oscillator producing periodic timing pulses,
   means synchronized with said timing pulses for periodically actuating said source to generate in sequence an acoustic impulse at each of a plurality of points spaced along said line of exploration,
   a magnetic recording system connected to said detector for serially recording on a magnetic medium in magnetically reproducible form signals representative of acoustic waves arriving at said detector,
   means connecting said timing pulses to said magnetic recording system so that said timing pulses are recorded on said magnetic medium in correlation with the recorded acoustic waves arriving at said detector,
   playback means adapted to receive said magnetic medium for sequentially producing therefrom a plurality of signals spaced one from another at intervals proportional to the intervals between said timing pulses to produce a plurality of output signals,
   compositing means connected to said playback means for combining said plurality of output signals,
   means connected to said playback means for reproducing the timing pulses recorded on said magnetic medium,
   a recorder,
   means for applying said timing pulses to said recorder to initiate the recording of a function upon the occurrence of each timing pulse, and means connecting said playback means and said compositing means to said recorder so that each recorded function is representative of geophysical characteristics of the formation being explored at each of said plurality of points along said line of exploration.

References Cited by the Examiner
UNITED STATES PATENTS

| | | | |
|---|---|---|---|
| 2,849,076 | 8/1958 | Kaufman | 181—.5 |
| 2,888,663 | 5/1959 | Blake et al. | 340—15.5 |
| 2,916,724 | 12/1959 | Peterson | 340—15.5 |
| 2,926,739 | 3/1960 | Shoemaker | 181—.5 |
| 2,950,459 | 8/1960 | Loper et al. | 181—.5 X |
| 2,952,834 | 9/1960 | Noonan et al. | 181—.5 X |
| 2,994,397 | 8/1961 | Huckabay | 340—7 |
| 3,018,838 | 1/1962 | Hammond | 340—15.5 |

SAMUEL FEINBERG, *Primary Examiner.*

LAURENCE V. EFNER, CHESTER L. JUSTUS,
*Examiners.*